(12) United States Patent
Lebowsky et al.

(10) Patent No.: US 6,614,734 B1
(45) Date of Patent: Sep. 2, 2003

(54) PROCESS AND DEVICE FOR CONTROLLING AN INCIDENT OPTICAL BEAM FOR READING A TRACK OF INFORMATION ON A DYNAMIC MEDIUM

(75) Inventors: Fritz Lebowsky, Corps d'Uriage (FR); Sonia Marrec, Meylan (FR)

(73) Assignee: STMicroelectronics SA, Gentilly (FR)

( * ) Notice: Subject to any disclaimer, the term of this patent is extended or adjusted under 35 U.S.C. 154(b) by 0 days.

(21) Appl. No.: 09/527,494

(22) Filed: Mar. 16, 2000

(30) Foreign Application Priority Data

Mar. 16, 1999 (FR) .............................. 99 03237

(51) Int. Cl.[7] .............................. G11B 7/00
(52) U.S. Cl. .............................. 369/44.34
(58) Field of Search .............. 369/44.34, 44.28, 369/44.29, 75.2, 124.01

(56) References Cited

U.S. PATENT DOCUMENTS

| | | | | |
|---|---|---|---|---|
| 4,467,462 A | * | 8/1984 | Shibata | 369/44.25 |
| 5,721,717 A | * | 2/1998 | Obata et al. | 369/44.27 |
| 5,808,979 A | | 9/1998 | Ishibashi et al. | 369/44.35 |
| 6,233,210 B1 | * | 5/2001 | Schell | 369/44.25 |
| 6,285,635 B1 | * | 9/2001 | Watanabe et al. | 369/44.27 |
| 6,388,969 B1 | * | 5/2002 | Lebowsky et al. | 369/124.01 |

FOREIGN PATENT DOCUMENTS

| | | |
|---|---|---|
| EP | 0 356 201 A2 | 8/1989 |
| EP | 0 803 865 A1 | 4/1997 |
| EP | 0 822 542 A2 | 7/1997 |
| EP | 0 895 227 A1 | 7/1997 |
| WO | 98/49679 | 11/1998 |

* cited by examiner

*Primary Examiner*—Thang V. Tran
*Assistant Examiner*—Bach Vuong
(74) *Attorney, Agent, or Firm*—Lisa K. Jorgenson; Allen, Dyer, Doppelt, Milbrath & Gilchrist, P.A.

(57) ABSTRACT

A process and device are provided for controlling an incident optical beam for reading a track of a dynamic medium, e.g. a digital disc, having information stored therein. The beam reflected by the disc is picked up by an optical pickup having several photodetectors and the positioning error of the beam with respect to the track is determined from elementary signals delivered respectively by the photodetectors and from an overall signal containing the information and delivered by the pickup.

18 Claims, 6 Drawing Sheets

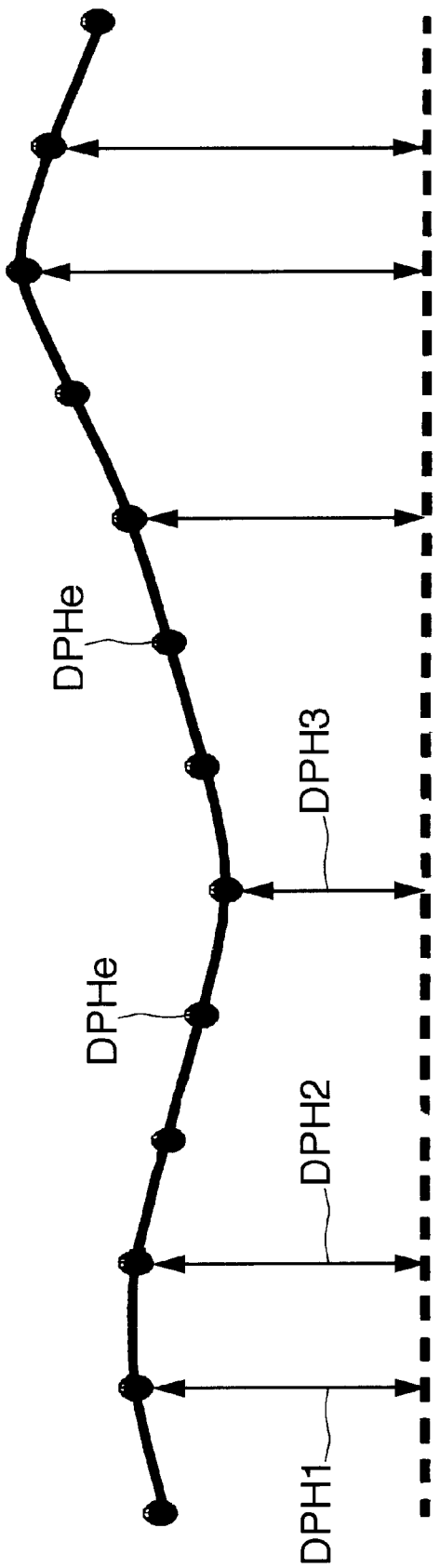

PROCESS AND DEVICE FOR CONTROLLING AN INCIDENT OPTICAL BEAM FOR READING A TRACK OF INFORMATION ON A DYNAMIC MEDIUM

FIELD OF THE INVENTION

The invention relates to the controlling of an incident optical beam for reading a track of information on a dynamic medium, and more particularly, to the control and determination of the positioning error of the incident beam with respect to the track. The invention applies advantageously but not limitingly to digital discs, especially those known as compact discs, e.g. a Read Only Memory Compact Disc (CDROM), and most particularly to multifunction digital discs such as a Digital Versatile Disc (DVD), storing image data in a compressed manner.

BACKGROUND OF THE INVENTION

A digital disc includes a single spiral track whose relief is representative of the binary information stored on the track of the disc. The track of the disc is illuminated by an incident optical beam, for example a laser spot, and several photodetectors, for example four, detect the reflection of the light beam on the disc. The optical pickup formed by the photodetectors then delivers four respective elementary signals, as well as an overall signal, or useful signal, equal to the sum of the four elementary signals, from which the binary information read on the track is extracted.

The directing or slaving of the optical beam to the track of the rotating dynamic disc is performed exclusively on the basis of the four elementary signals delivered by the photodetectors. More precisely, the signals are summed in pairs so as to form two signals which are equalized in an analog equalizer before being shaped, by comparison with a threshold, in two comparators. The two signals thus shaped are mutually phase shifted if the laser spot is not situated on the track. The phase difference between these two signals is then detected, which phase difference corresponds to the positioning error of the beam with respect to the track. This positioning error is then used conventionally in a servo-control loop to modify the incident optical system and direct the optical beam back to the track.

Such a prior art device includes a considerable number of analog components, which add to the size of the device. Moreover, as the technology advances, the modification and production of new components of the device require considerable design and production time.

SUMMARY OF THE INVENTION

An object of the invention is to provide a solution to these problems and is intended in particular to improve the accuracy in the determination of the positioning error, while avoiding the use of analog equalizers.

The invention also makes it possible to detect misalignments or local phase shifts between the various analog paths for processing the signals delivered by the photodetectors.

The invention uses a different approach from the conventional systems by using the overall signal or useful signal for the determination of the positioning error of the beam with respect to the track. Previously, this useful signal was used only for the extraction of the data. More precisely, the invention provides a process for controlling an incident optical beam for reading a track of a dynamic carrier of information contained in the track.

According to a general characteristic of the invention, the beam reflected by the disc is picked up by an optical pickup comprising several photodetectors (at least two and typically four). The positioning error of the beam with respect to the track is determined from the elementary signals delivered respectively by the photodetectors and from an overall signal containing the information and delivered by the pickup.

According to one embodiment of the invention, two signals are generated from the elementary signals delivered respectively by the photodetectors, which hereinafter are dubbed "secondary signals", whose mutual phase shift is representative of the positioning error of the beam with respect to the track. The overall signal which is equal to the sum of the elementary signals is also generated. The two secondary signals are sampled and the samples which allow the determination of the mutual phase shift, by using the overall signal, are selected.

More precisely, according to one embodiment, the two secondary signals are sampled on the basis of a sampling clock signal, the transitions of the overall signal with respect to a predetermined threshold are detected using an auxiliary sampling signal obtained from the sampling signal and having a period equal to a fraction of the period of the sampling clock signal. At least the two samples of the two secondary signals which temporally flank a transition of the overall signal and whose levels are closest to the threshold are selected.

The invention is based upon the observation that the overall signal is theoretically always situated between the two secondary signals and in the middle of them. Also, the overall signal, and more particularly its transitions with respect to the predetermined threshold, will serve as phase references. More precisely, by selecting two samples which almost symmetrically flank the transition, it is made certain that these two selected samples do indeed belong to the two secondary signals, and that the calculation of the phase shift on the basis of these two selected samples will lead to a correct estimation of the positioning error.

Also, the use of this overall signal for the determination of the positioning error makes it possible to avoid using analog equalizers as in the prior art. Specifically, the analog equalizers were intended to equalize the levels of the signals by amplifying levels or amplitudes which are too low. Also, the use of the overall signal as means of selection allows errorless selection of the samples corresponding to even low secondary signal levels.

It would be possible to calculate the mutual phase shift of the two secondary signals solely on the basis of the two selected samples, especially in the case where the sampling frequency is high. This being so, in order to further increase the accuracy of determination of this phase shift, and hence of the positioning error, it is particularly advantageous to select more than one sample for each secondary signal, and to do so, especially if the sampling frequency is relatively low.

More precisely, according to one embodiment of the invention, for each secondary signal, at least two samples are selected which are situated on either side of the predetermined threshold and are representative for each secondary signal of a crossing of the threshold by the secondary signal in the same direction as the transition of the overall signal. An interpolation, for example a linear interpolation, is then performed between the two selected samples of each secondary signal so as to determine, for each secondary signal, a calculated sample whose level corresponds to the threshold. The positioning error is then determined from the two calculated samples.

The person skilled in the art will readily be able to choose one of these alternative embodiments in view of the particular application and in view of the accuracy required for the calculation of the phase shift.

An object of the invention is also to provide a device for controlling an incident optical beam for reading a track of information stored on a dynamic medium.

According to a general characteristic of the invention, this device includes a pickup for picking up the beam reflected by the disc and which includes several photodetectors. The device also includes a controller for determining the positioning error of the beam with respect to the track from the elementary signals delivered respectively by the photodetectors and from the overall signal containing the information and delivered by the pickup.

According to one embodiment of the invention, the controller includes a preprocessor for generating, from the elementary signals delivered respectively by the photodetectors, two secondary signals whose mutual phase shift is representative of the positioning error of the beam with respect to the track, as well as the overall signal equal to the sum of the elementary signals. The controller also includes a processor having a sampler for sampling the two secondary signals, a selector for selecting the samples which allow the determination of the mutual phase shift, by using the overall signal, and a calculator for determining the mutual phase shift from the selected samples.

The controller advantageously comprises a generator, for example a quartz, for generating a sampling clock signal, while the sampler comprises two analog/digital converters able to sample the two secondary signals on the basis of the sampling clock signal. The processor advantageously comprises a digital phase-lock loop for receiving the overall signal and the sampling signal and for detecting the transitions of the overall signal with respect to a predetermined threshold. The selector is then able to select at least the two samples of the two secondary signals which temporally flank a transition of the overall signal and whose levels are the closest to the threshold.

According to another embodiment of the invention, the selector is able to select, for each secondary signal, at least two samples situated on either side of the predetermined threshold and representative for each secondary signal of a crossing of the threshold by the secondary signal in the same direction as the transition of the overall signal. The processor then comprises an interpolator for performing an interpolation, for example a linear or non-linear interpolation, between the two selected samples of each secondary signal so as to determine, for each secondary signal, a calculated sample whose level corresponds to the threshold. The calculator determines the positioning error from the two calculated samples.

Finally, it is preferable for the processor to comprise a low-pass or median interpolator filter linked to the output of the calculator, thus making it possible to interpolate a positioning error with respect to two positioning errors actually calculated, when this calculation is not possible, for example, when the two samples of the secondary signals intended a priori for the calculation of the phase shift error do not in fact correspond to two samples making it possible to obtain the positioning error without error.

BRIEF DESCRIPTION OF THE DRAWINGS

Other advantages and characteristics of the invention will become apparent on examining the detailed description and embodiments, which are in no way limiting, and of the appended drawings in which:

FIGS. 3 to 6 illustrate, more particularly, a manner of operation of the device according to the invention, allowing implementation of the process according to the invention.

DETAILED DESCRIPTION OF THE PREFERRED EMBODIMENTS

Figure 1:
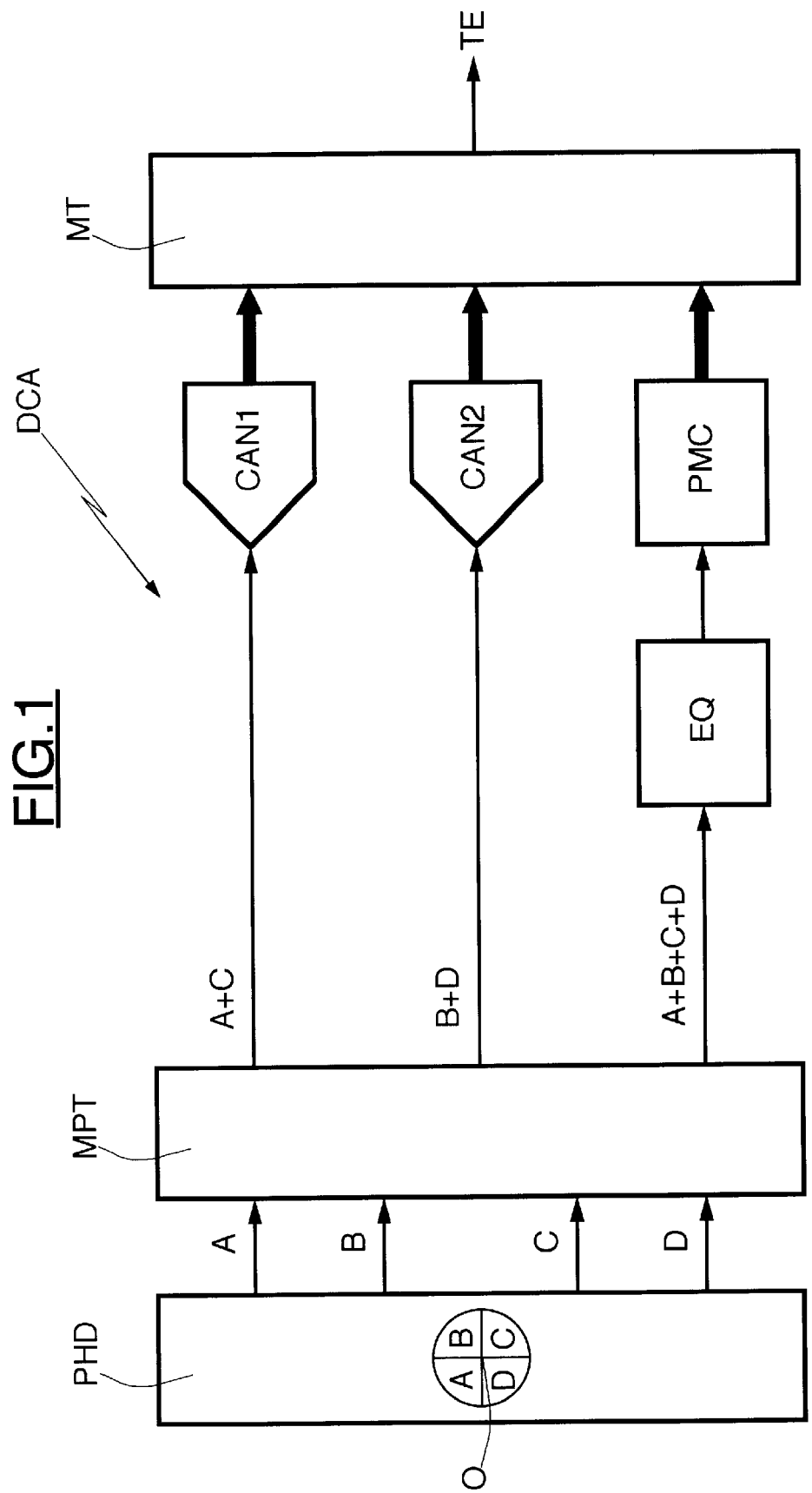
FIG. 1 is a partial schematic overview of a directing device according to the invention.

In FIG. 1, a directing control device DCA according to the invention, includes at the front end, a pickup having four photodetectors A, B, C, D. In practice, a laser diode emits a laser beam which is directed towards the face of the disc on which the track containing the information is etched, by way of a beam splitter and of a conventional optical system. The beam reflected by the disc then passes through the beam splitter in the opposite direction and is picked up by the four photodetectors A, B, C, D each of which is situated in a plane parallel to the plane of the disc. Each photodetector delivers a signal which has been referenced, for simplifying purposes, by the same letter as that assigned to the photodetector. These elementary signals A, B, C, D are thereafter processed in preprocessor MPT, essentially comprising adders, as would be readily appreciated by the skilled artisan. More precisely, the two elementary signals delivered by the two photodetectors which are symmetric with respect to the center O of the pickup are summed. Thus, one of the secondary signals is equal to the sum of the elementary signals A and C, while the other secondary signal is equal to the sum of the elementary signals B and D.

Moreover, the preprocessor MPT delivers the overall signal or useful signal, equal to the sum of the four elementary signals A, B, C and D. It is from this useful signal that the information contained in the track will be extracted. The two secondary signals A+C and B+D are thereafter respectively sampled in two analog digital converters CAN1 and CAN2.

The sampling clock signal is delivered for example by a quartz (not represented here for simplifying purposes) and this clock signal is also used for a digital phase-lock loop PMC, of a known structure. This digital loop PMC receives the equalized overall signal after passing through an equalizer EQ, also of a known structure.

The digital phase-lock loop PMC also receives the sampling clock signal and generates an auxiliary sampling signal whose period TPMC is equal to Te/n where Te is the period of the sampling clock signal and n is an integer. Any transition of the input signal (that is to say the overall signal) with respect to a predetermined threshold SE (for example the value zero) is detected, and the interval of the auxiliary sampling signal within which the transition is situated is determined. More precisely, the digital phase-lock loop PMC delivers, as output, a digital word representative of the distance T between any detected transition of the overall signal and the rising edge of the immediately preceding clock signal. In practice, by way of example, if the phase-lock loop typically includes thirty-two inverters making it possible to subdivide the period Te of the sampling clock signal into thirty-two intervals (n=32), the digital phase-lock loop PMC will deliver a word of five bits representing the index of the interval in which the transition is situated, in other words, the distance between the rising edge of the sampling clock signal and the transition of the signal. Thus, a digital word equal to 00000 will be representative of a transition in phase with the rising edge of the clock signal, while a digital word equal to 11111 will be representative of a transition situated just ahead of the subsequent rising edge of the clock signal.

Figure 2:
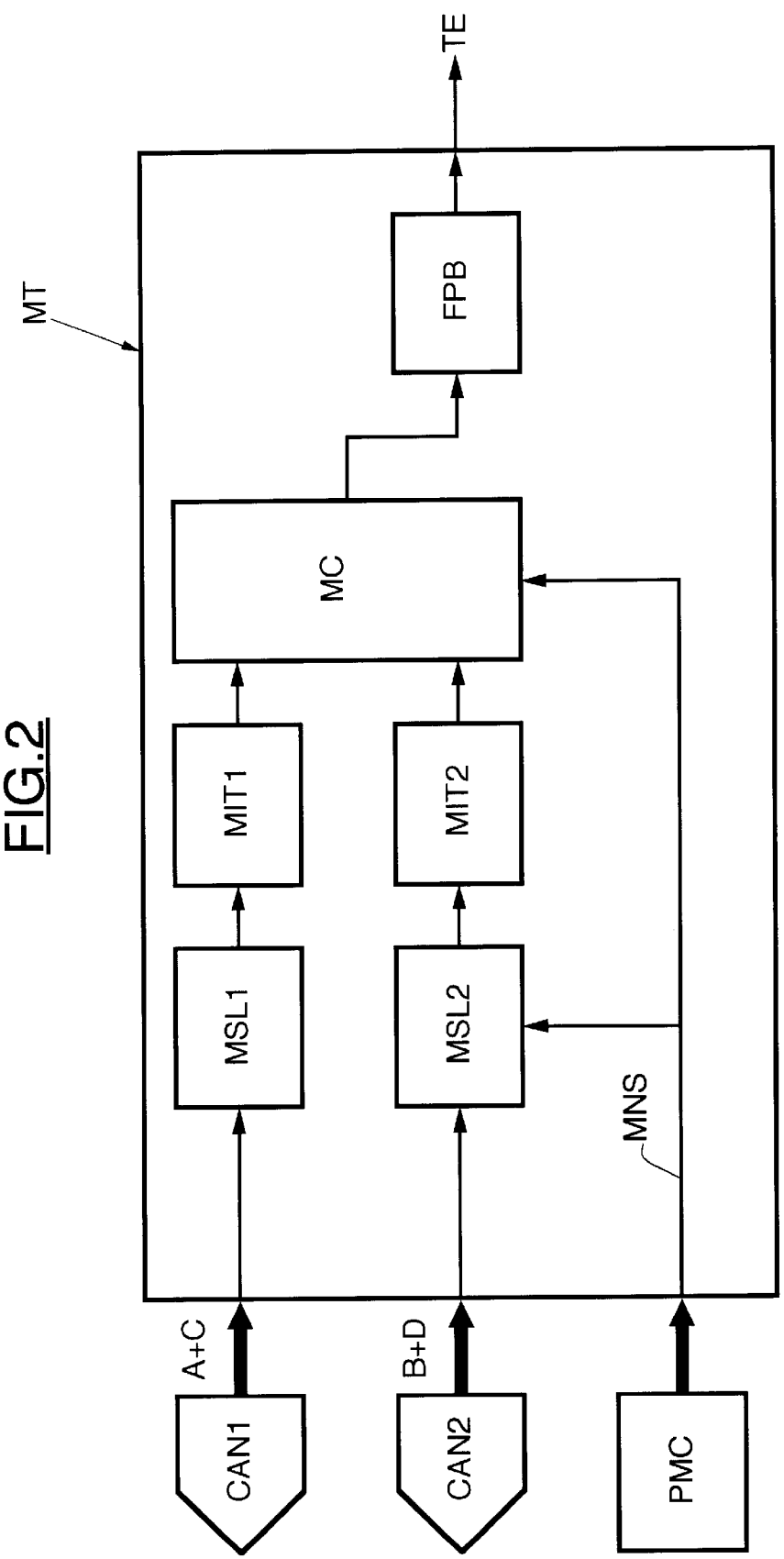
FIG. 2 schematically illustrates a part of the device of FIG. 1.

The output signals from the analog digital converters CAN1 and CAN2 as well as the digital output word MNS from the loop PMC, are delivered to processor MT which will determine the positioning error TE of the beam with respect to the track. The structure of the processor is now described in greater detail while referring more particularly to FIG. 2.

The processor MT essentially comprises a selectors MSL1 and MSL2 for receiving the samples of the signals A+C and B+D respectively, as well as the output signal MNS delivered by the loop PMC. The processor MT further comprises interpolators MIT1 and MIT2 linked to the output of the selectors MSL1 and MSL2. The output of these interpolators being linked to calculator MC. Finally, an interpolator filter FPB, typically a low-pass filter, is linked between the output of the calculator MC and the output of the processor which delivers the positioning error TE.

The selectors, interpolators and calculator will now be described functionally, as they may possibly be embodied by software within a controller for example. For its part, the low-pass filter can likewise be embodied by software or else as a specific integrated circuit. Reference is now made more particularly to FIGS. 3 to 6 to describe the manner of operation of the various features according to the invention, as well as an implementation of the process according to the invention.

Figure 3:
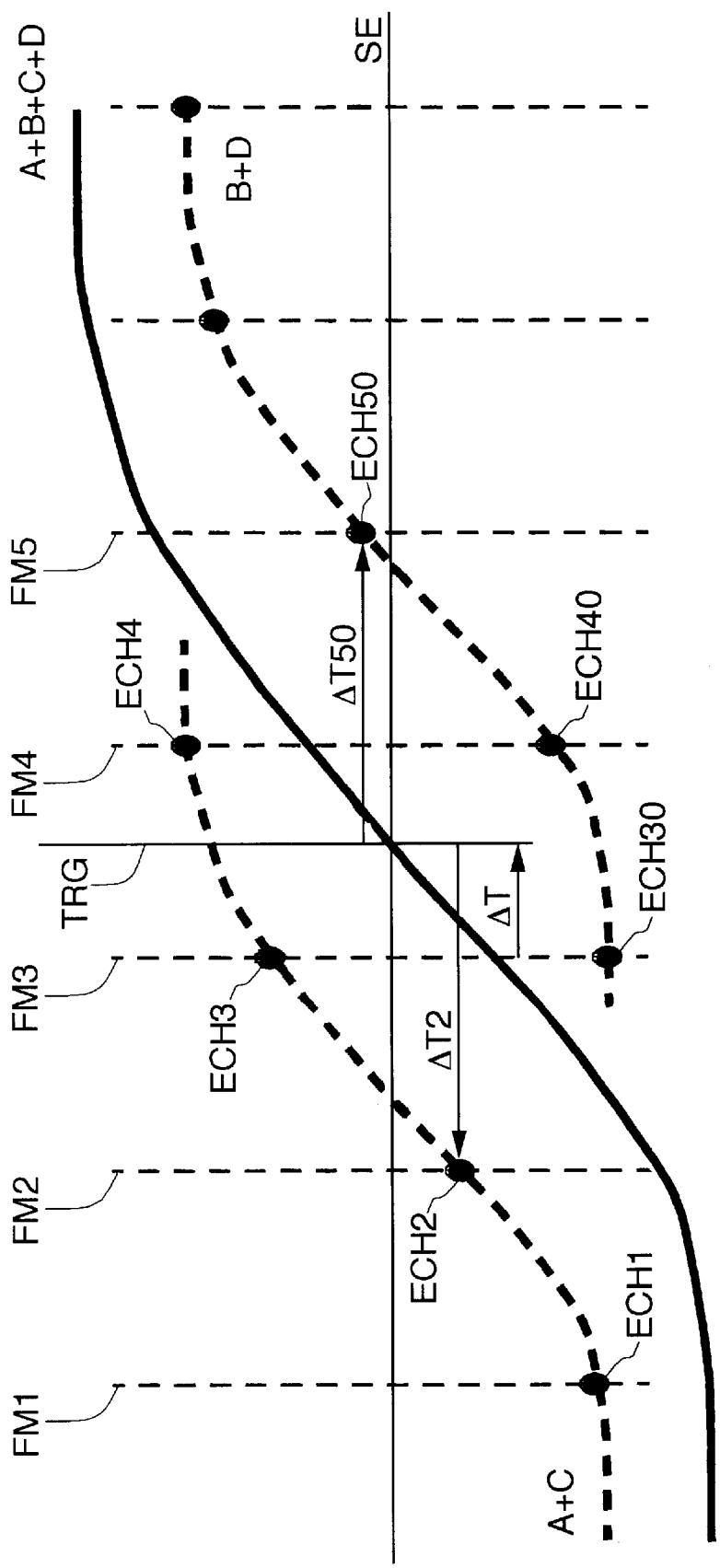

In FIG. 3, the references FM1, FM2, FM3, FM4 and FM5 designate five successive rising edges of the sampling clock signal. The references ECH1, ECH2, ECH3 and ECH4 designate the samples of the secondary signal A+C delivered respectively upon the rising edges FM1 to FM4. Likewise, the references ECH30, ECH40 and ECH50 designate the three samples of the secondary signal B+D which are delivered respectively upon the rising edges FM3 to FM5.

It is assumed here that a rising transition TRG of the overall signal A+B+C+D (crossing of the threshold SE) has been detected by the loop PMC and that the time gap between the rising edge FM3 of the sampling clock signal and this transition TRG is equal to T. During operation, a certain number of samples of the two secondary signals are stored permanently in a memory, for example in two memories of the "first in", "first out" type (FIFO) whose size determines the number of samples permanently stored.

The selectors MSL1 and MSL2 will then select from among the stored samples, at least the two samples (here ECH2 and ECH50) of the two secondary signals whose levels or amplitudes are closest to the predetermined threshold SE, and which moreover, symmetrically flank, to within a predetermined tolerance, the transition TRG. Stated otherwise, a check is made as to whether, for these samples ECH2 and ECH50, the respective (temporal) distances T2 and T50 between the transition TRG and these samples ECH2 and ECH50 are within a tolerance.

The person skilled in the art will have noted that the distances T2 and T50 may readily be calculated since the digital output word MNS delivered by the loop PMC supplies the value T and since the duration between two successive rising edges of the sampling clock signal is known. It would then be possible for example to now calculate the phase shift between the two secondary signals A+C and B+D, using solely the two selected samples ECH2 and ECH50 and summing the values T2 and T50.

Figure 4:
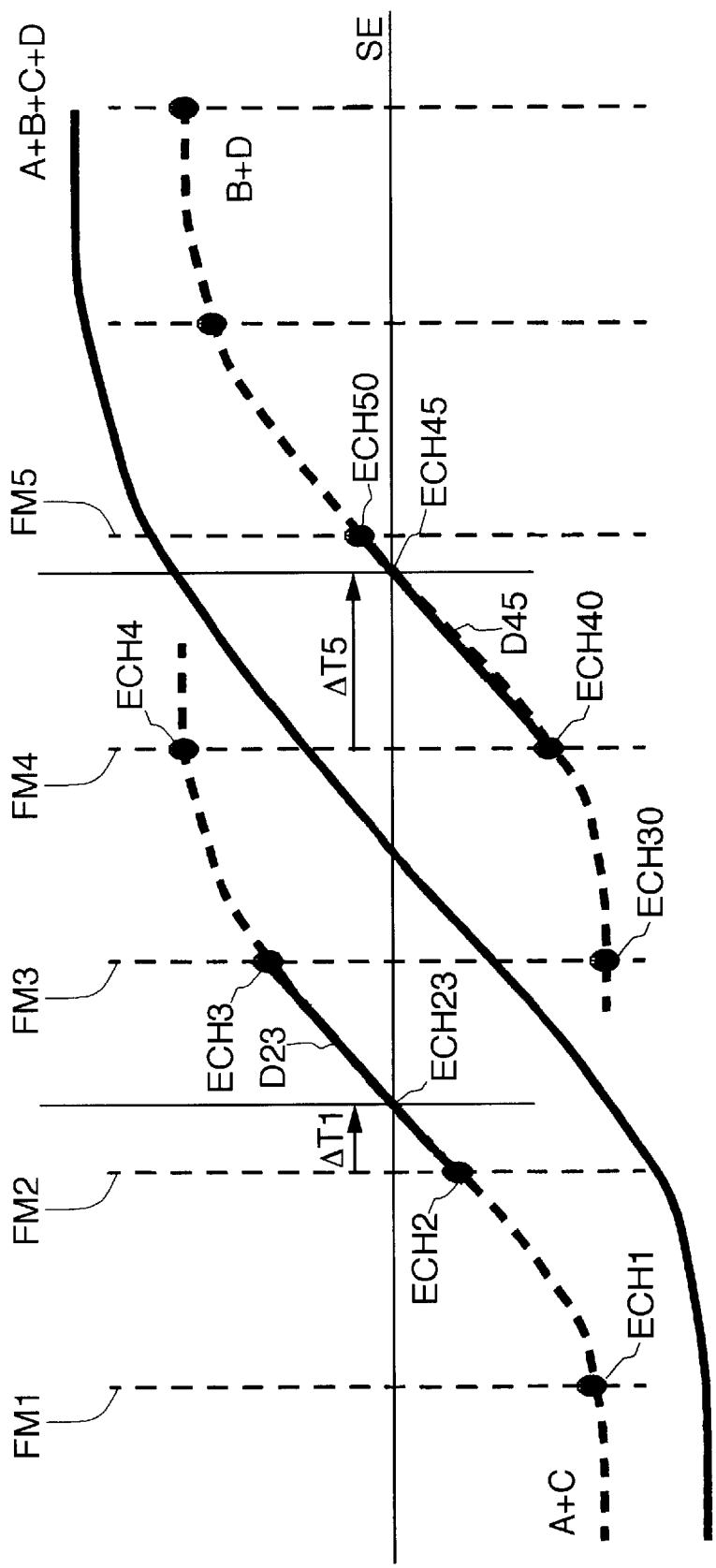
Figure 5:
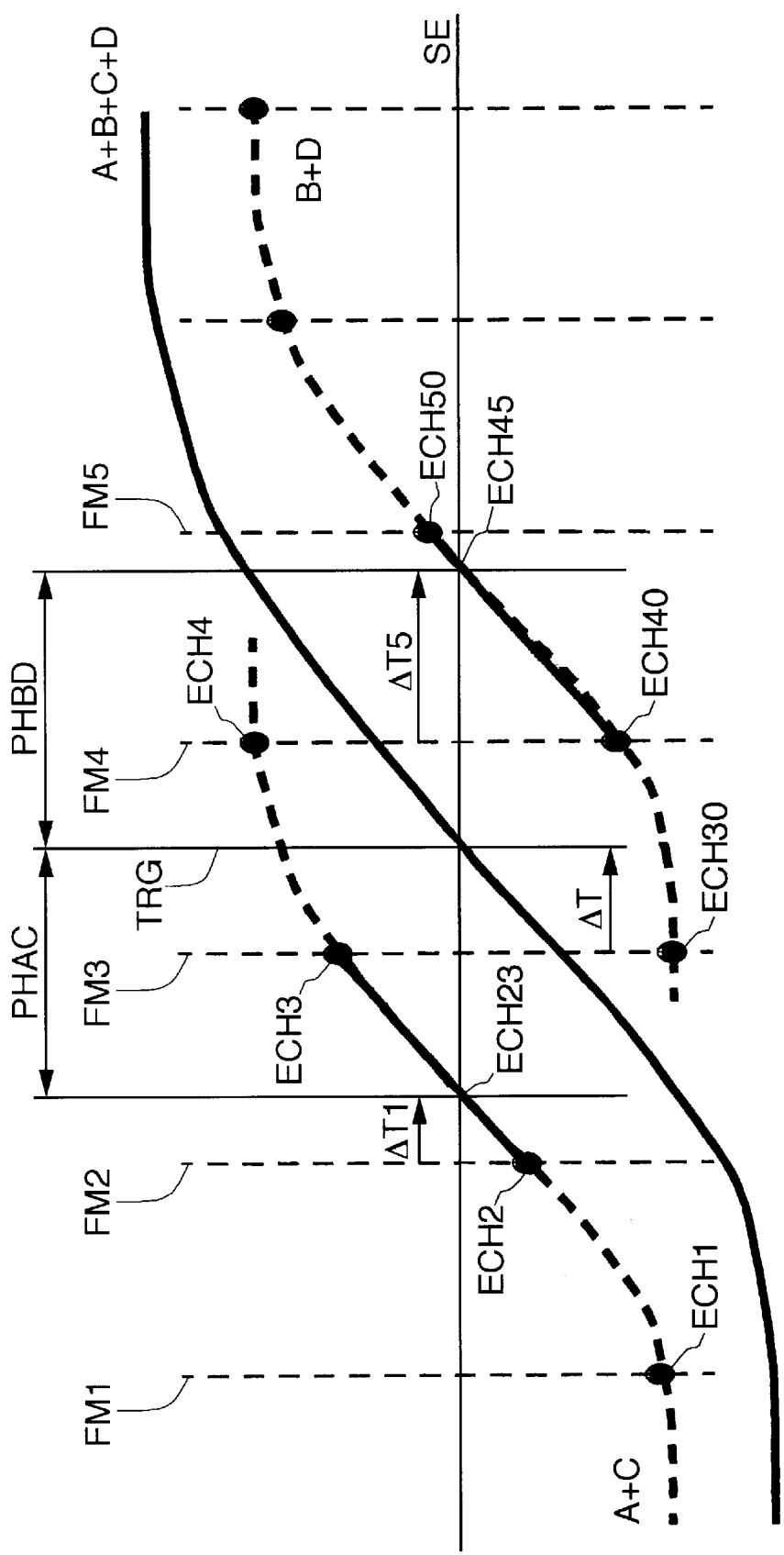

Of course, such a calculation may only be envisaged for a relatively high sampling frequency, so that the samples selected exhibit the smallest possible gap in level with respect to the threshold SE. This being so, in order to further increase the accuracy in the calculation of the phase shift, and especially for applications in which the frequency of the clock signal is deemed to be too small, it is preferable also to select for each secondary signal another sample situated on the other side of the threshold SE, with respect to the sample previously selected (FIG. 4).

More precisely, regarding the signal A+C, the sample ECH3 defining, with the sample ECH2, a rising transition of the signal A+C is selected. Likewise, for the signal B+D, the sample ECH40 defining, with the sample ECH50, likewise a rising transition of the signal B+D is selected.

The interpolators MIT1 and MIT2 then perform a conventional linear interpolation, between the samples ECH2 and ECH3, and between the samples ECH40 and ECH50. Through this operation, the interpolators MIT1 determine the temporal distance T1 separating the calculated sample ECH23 (situated at the intersection of the straight line D23 and the level SE) with respect to the rising edge FM2 of the clock signal. Likewise, the interpolator MIT2 makes it possible to define the temporal distance T5 separating the rising edge FM4 of the calculated sample ECH45 situated at the intersection of the straight line D45 and of the threshold SE. Here, the phase of the secondary signal A+C with respect to the rising edge FM2 is determined, as well as the phase of the signal B+D with respect to the rising edge FM4.

The calculator MC can then readily calculate (FIG. 5) the phase PHAC of the signal A+C with respect to the transition TRG of the overall signal which forms the phase reference, as well as the phase PHBD of the signal B+D with respect to this phase reference. To this end, it is possible to use the values T, T1, T5 and the value of the period of the sampling clock signal, for example. The mutual phase shift DPH between the signals A+C and B+D is then equal to the sum of the phases PHAC and PHBD.

The successive values of phase shift DPHi between the signals A+C and B+D, which are calculated by the calculator MC, are delivered to the interpolator filter FPB (FIG. 6). The function of this filter FPB is to calculate, by interpolation, interpolated phase shift values DPHe from values actually calculated by the calculator MC, when these phase shift values are not available. Such is the case, for example, when one of the secondary signals is momentarily unexploitable.

Stated otherwise, this filter FPB makes it possible to deliver in a regular manner phase shift values representative of the positioning error of the beam on the track, and which will make it possible to correct this position and to continuously direct the optical beam to the track of the rotating disc.

In the above figures, the overall signal A+B+C+D has deliberately, for simplifying purposes, been represented in the middle of the signals A+C and B+D. This being so, an asymmetry between the position of the secondary signals with respect to the position of the overall signal is possible in practice and representative of a local "misalignment" between the four paths for processing the four elementary signals A, B, C and D. This misalignment can originate from various causes, for example from interference on cables. In this case, the invention makes it possible to compensate for this misalignment by acting at the level of the preprocessor for example, by deliberate addition of a small phase shift applied to one of the secondary signals A+C or B+D, this phase shift being proportional to the symmetry error observed between the two signals A+C and B+D, with respect to the overall signal.

The use according to the invention of the useful signal thus makes it possible avoid the use of analog equalizers on the paths for processing the elementary signals emanating from the photodetectors and to employ this signal as reference signal for the determination of the phase shift and hence of the positioning error (and likewise for noisy summed signals of low amplitude).

It is thus possible to integrate all the components of the directing controller onto one circuit which is able to very easily accommodate technological advances. Of course, the above-described embodiment of the processor as software may also be embodied by logic components in the form of integrated circuits by using conventional logic synthesis software.

That which is claimed is:

1. A method for controlling an optical beam for reading a track of information on a dynamic medium, the method comprising the steps of:
   directing the optical beam at a track;
   using an optical pickup to pickup a reflected beam from the dynamic medium, the optical pickup comprising a plurality of photodetectors which generate respective elementary signals and an overall signal corresponding to the information;
   determining a positioning error of the optical beam with respect to the track from the elementary signals and the overall signal from the photodetectors;
   generating two secondary signals, whose mutual phase shift is representative of the positioning error of the beam with respect to the track, from the elementary signals generated respectively by the photodetectors;
   generating the overall signal from a sum of the elementary signals;
   sampling the two secondary signals; and
   selecting samples which allow the determination of the mutual phase shift, by using the overall signal.

2. A method according to claim 1, wherein the two secondary signals are sampled on the basis of a sampling clock signal; and further comprising the step of detecting transitions of the overall signal with respect to a predetermined threshold using an auxiliary sampling clock signal obtained from the sampling clock signal and having a period equal to a fraction of a period of the sampling clock signal; and wherein the step of selecting the samples comprises selecting at least two samples of the two secondary signals which temporally flank a transition of the overall signal and whose levels are closest to the predetermined threshold.

3. A method according to claim 2, further comprising the steps of:
   selecting, for each secondary signal, at least two samples which are situated on either side of the predetermined threshold and are representative for each secondary signal of a crossing of the threshold by the secondary signal in a same direction as the transition of the overall signal; and
   performing an interpolation between the two selected samples of each secondary signal so as to determine, for each secondary signal, a calculated sample whose level corresponds to the predetermined threshold, wherein the positioning error is determined from the calculated samples.

4. A method for controlling an optical beam for reading a track of information on a dynamic medium, the method comprising the steps of:
   directing the optical beam at a track;
   using a plurality of photodetectors to pickup a reflected beam from the dynamic medium;
   generating an overall signal, from a sum of the elementary signals, corresponding to the information, from the plurality of photodetectors;
   generating a plurality of elementary signals each from one of the plurality of photodetectors;
   determining a positioning error of the optical beam with respect to the track from the elementary signals and the overall signal;
   generating two secondary signals, whose mutual phase shift is representative of the positioning error of the beam with respect to the track, from the elementary signals;
   sampling the two secondary signals; and
   selecting samples which allow the determination of the mutual phase shift, by using the overall signal.

5. A method according to claim 4, wherein the two secondary signals are sampled on the basis of a sampling clock signal; and further comprising the step of detecting transitions of the overall signal with respect to a predetermined threshold using an auxiliary sampling clock signal obtained from the sampling clock signal and having a period equal to a fraction of a period of the sampling clock signal; and wherein the step of selecting the samples comprises selecting at least two samples of the two secondary signals which temporally flank a transition of the overall signal and whose levels are closest to the predetermined threshold.

6. A method according to claim 5, further comprising the steps of:
   selecting, for each secondary signal, at least two samples which are situated on either side of the predetermined threshold and are representative for each secondary signal of a crossing of the threshold by the secondary signal in a same direction as the transition of the overall signal; and
   performing an interpolation between the two selected samples of each secondary signal so as to determine, for each secondary signal, a calculated sample whose level corresponds to the predetermined threshold, wherein the positioning error is determined from the calculated samples.

7. A device for controlling an optical beam for reading a track of information on a dynamic medium, the device comprising:
   a pickup for picking up a reflected optical beam from the dynamic medium and comprising a plurality of photodetectors for generating respective elementary signals and an overall signal corresponding to the information; and
   a pickup controller for determining a positioning error of the optical beam with respect to the track from the elementary signals generated respectively by the photodetectors and from the overall signal corresponding to the information, the pickup controller comprising
      a preprocessor for generating, from the elementary signals generated respectively by the photodetectors, two secondary signals whose mutual phase shift is representative of the positioning error of the optical beam with respect to the track, and for generating the overall signal as a sum of the elementary signals, and
      a processor comprising
         a sampler for sampling the two secondary signals,
         a selector for selecting samples which allow a determination of the mutual phase shift, by using the overall signal, and a calculator for determining the mutual phase shift from the selected samples.

8. A device according to claim 7, wherein the pickup controller comprises a generator for generating a sampling clock signal; and wherein the sampler comprises two analog/digital converters for sampling the two secondary signals on the basis of the sampling clock signal; and wherein the processor further comprises a digital phase-lock loop for receiving the overall signal and the sampling clock signal and for detecting transitions of the overall signal with respect to a predetermined threshold; and wherein the selector selects at least the two samples of the two secondary signals which temporally flank a transition of the overall signal and whose levels are the closest to the predetermined threshold.

9. A device according to claim 8, wherein the selector selects, for each secondary signal, at least two samples situated on either side of the predetermined threshold and representative for each secondary signal of a crossing of the threshold by the secondary signal in a same direction as the transition of the overall signal; and wherein the processor further comprises an interpolator for performing an interpolation between the two selected samples of each secondary signal so as to determine, for each secondary signal, a calculated sample whose level corresponds to the threshold; and wherein the calculator determines the positioning error from the two calculated samples.

10. A device according to claim 7, wherein the processor further comprises an interpolator filter linked to an output of the calculator.

11. A device for controlling an optical beam for reading a track of information on a dynamic medium, the device comprising:
   a plurality of photodetectors for picking up a reflected optical beam from the dynamic medium and for generating respective elementary signals and an overall signal corresponding to the information; and
   a controller for determining a positioning error of the optical beam with respect to the track from the elementary signals generated respectively by the photodetectors and from the overall signal corresponding to the information, the controller comprising
      a preprocessor for generating, from the elementary signals, two secondary signals whose mutual phase shift is representative of the positioning error of the optical beam with respect to the track, and for generating the overall signal as a sum of the elementary signals, and
      a processor comprising
         a sampler for sampling the two secondary signals,
         a selector for selecting samples which allow a determination of the mutual phase shift, by using the overall signal, and
         a calculator for determining the mutual phase shift from the selected samples.

12. A device according to claim 11, wherein the controller comprises a generator for generating a sampling clock signal; and wherein the sampler comprises analog/digital converters for sampling the two secondary signals on the basis of the sampling clock signal; and wherein the processor further comprises a digital phase-lock loop for receiving the overall signal and the sampling clock signal and for detecting transitions of the overall signal with respect to a predetermined threshold; and wherein the selector selects at least two samples of the two secondary signals which temporally flank a transition of the overall signal and whose levels are the closest to the predetermined threshold.

13. A device according to claim 12, wherein the selector selects, for each secondary signal, at least two samples situated on either side of the predetermined threshold and representative for each secondary signal of a crossing of the threshold by the secondary signal in a same direction as the transition of the overall signal; and wherein the processor further comprises an interpolator for performing an interpolation between the two selected samples of each secondary signal so as to determine, for each secondary signal, a calculated sample whose level corresponds to the threshold; and wherein the calculator determines the positioning error from the two calculated samples.

14. A device according to claim 11, wherein the processor further comprises an interpolator filter linked to an output of the calculator.

15. A dynamic optical information storage device for reproducing information from a track of an optical disc and comprising:
   an optical head for generating an optical beam at a track of the optical disc;
   a plurality of photodetectors for picking up a reflected optical beam from the optical disc and for generating respective elementary signals and an overall signal corresponding to information stored on the track; and
   a controller for determining a positioning error of the optical beam with respect to the track from the elementary signals and the overall signal, the controller comprising
      a preprocessor for generating, from the elementary signals, two secondary signals whose mutual phase shift is representative of the positioning error of the optical beam with respect to the track, and for generating the overall signal as a sum of the elementary signals, and
      a processor comprising
         a sampler for sampling the two secondary signals,
         a selector for selecting samples which allow a determination of the mutual phase shift, by using the overall signal, and
         a calculator for determining the mutual phase shift from the selected samples.

16. A device according to claim 15, wherein the controller comprises a generator for generating a sampling clock signal; and wherein the sampler comprises analog/digital converters for sampling the two secondary signals on the basis of the sampling clock signal; and wherein the processor further comprises a digital phase-lock loop for receiving the overall signal and the sampling clock signal and for detecting transitions of the overall signal with respect to a predetermined threshold; and wherein the selector selects at least two samples of the two secondary signals which temporally flank a transition of the overall signal and whose levels are the closest to the predetermined threshold.

17. A device according to claim 16, wherein the selector selects, for each secondary signal, at least two samples situated on either side of the predetermined threshold and representative for each secondary signal of a crossing of the threshold by the secondary signal in a same direction as the transition of the overall signal; and wherein the processor further comprises an interpolator for performing an interpolation between the two selected samples of each secondary signal so as to determine, for each secondary signal, a calculated sample whose level corresponds to the threshold; and wherein the calculator determines the positioning error from the two calculated samples.

18. A device according to claim 15, wherein the processor further comprises an interpolator filter linked to an output of the calculator.

* * * * *